United States Patent
Ohsawa et al.

(10) Patent No.: US 10,446,846 B2
(45) Date of Patent: Oct. 15, 2019

(54) NEGATIVE ELECTRODE ACTIVE MATERIAL PARTICLE, NEGATIVE ELECTRODE, LITHIUM ION SECONDARY BATTERY, AND METHOD OF PRODUCING NEGATIVE ELECTRODE ACTIVE MATERIAL PARTICLE

(71) Applicant: TOYOTA JIDOSHA KABUSHIKI KAISHA, Toyota-shi, Aichi-ken (JP)

(72) Inventors: Ryosuke Ohsawa, Okazaki (JP); Akira Tsujiko, Miyoshi (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 16/003,521

(22) Filed: Jun. 8, 2018

(65) Prior Publication Data
US 2019/0067697 A1   Feb. 28, 2019

(30) Foreign Application Priority Data
Aug. 24, 2017   (JP) ................................. 2017-161235

(51) Int. Cl.
*H01M 4/58*   (2010.01)
*C01B 33/18*   (2006.01)
*H01M 4/36*   (2006.01)
*H01M 10/0525*   (2010.01)
*H01M 4/02*   (2006.01)

(52) U.S. Cl.
CPC ........... *H01M 4/5825* (2013.01); *C01B 33/18* (2013.01); *H01M 4/366* (2013.01); *H01M 10/0525* (2013.01); *C01P 2002/54* (2013.01); *C01P 2006/40* (2013.01); *H01M 2004/027* (2013.01)

(58) Field of Classification Search
CPC ............... H01M 4/5825; H01M 4/366; H01M 10/0525; H01M 2004/027; C01B 33/18; C01P 2002/54; C01P 2006/40
See application file for complete search history.

(56) References Cited

U.S. PATENT DOCUMENTS

2017/0092940 A1*   3/2017   Kim ........................ H01M 4/38

FOREIGN PATENT DOCUMENTS

JP   2015-125957 A   7/2015
WO   2012/077268 A1   6/2012

* cited by examiner

*Primary Examiner* — Harold Y Pyon
*Assistant Examiner* — Danny N Kang
(74) *Attorney, Agent, or Firm* — Oliff PLC (57) ABSTRACT

A negative electrode active material particle has a composition represented by the following formula (I): $SiO_xD_y$ ... (I). In the formula (I), x satisfies $0 \leq x \leq 1.5$. D is a group 13 element or a group 15 element in a periodic table. In an outermost surface of the negative electrode active material particle, y satisfies $10^{-11} \leq y \leq 10^{-1}$. In a center of the negative electrode active material particle, y satisfies $y \leq 10^{-12}$.

9 Claims, 5 Drawing Sheets

NEGATIVE ELECTRODE ACTIVE MATERIAL PARTICLE, NEGATIVE ELECTRODE, LITHIUM ION SECONDARY BATTERY, AND METHOD OF PRODUCING NEGATIVE ELECTRODE ACTIVE MATERIAL PARTICLE

This nonprovisional application is based on Japanese Patent Application No. 2017-161235 filed on Aug. 24, 2017, with the Japan Patent Office, the entire contents of which are hereby incorporated by reference.

BACKGROUND

Field

The present disclosure relates to a negative electrode active material particle, a negative electrode, a lithium ion secondary battery, and a method of producing the negative electrode active material particle.

Description of the Background Art

WO2012/077268 discloses that a surface of a SiO (silicon oxide) particle is coated with carbon.

SUMMARY

Conventionally, in a lithium ion secondary battery, carbon-based negative electrode active material particles have been used. Each of Si (silicon) based negative electrode active material particles, i.e., Si particles and SiO particles, can have a specific capacity larger than that of the carbon-based negative electrode active material particle. It is expected that use of such Si-based negative electrode active material particles leads to a higher capacity of the lithium ion secondary battery. However, the use of the Si-based negative electrode active material particles tends to result in an increased resistance of the lithium ion secondary battery. This is presumably because each of the Si-based negative electrode active material particles has low electron conductivity.

In order to improve the electron conductivity of the Si-based negative electrode active material particle, it is considered to coat a surface of the Si-based negative electrode active material particle with carbon. However, carbon has high reactivity with respect to lithium (Li) ions and an electrolyte. Hence, during charging and discharging, it is considered that Li ions are consumed by the reaction with carbon. This presumably leads to a decreased cycle characteristic of the lithium ion secondary battery.

An object of the present disclosure is to improve electron conductivity of a Si-based negative electrode active material particle.

Hereinafter, the technical configuration, function and effect of the present disclosure will be described. However, the mechanism of the function of the present disclosure includes a presumption. The scope of claims should not be limited depending on whether the mechanism of the function is correct or incorrect.

[1] A negative electrode active material particle of the present disclosure is a negative electrode active material particle for a lithium ion secondary battery.

The negative electrode active material particle includes a composition represented by the following formula (I):

$$SiO_xD_y. \quad (I)$$

In the formula (I), x satisfies $0 \leq x \leq 1.5$.

D is a group 13 element or a group 15 element in a periodic table.

In an outermost surface of the negative electrode active material particle, y satisfies $10^{-11} \leq y \leq 10^{-1}$.

In a center of the negative electrode active material particle, y satisfies $y \leq 10^{-12}$.

The negative electrode active material particle (Si-based negative electrode active material particle) of the present disclosure is doped with a specific dopant. In the formula (I), D represents the dopant. The dopant is a group 13 element or a group 15 element.

Figure 1:
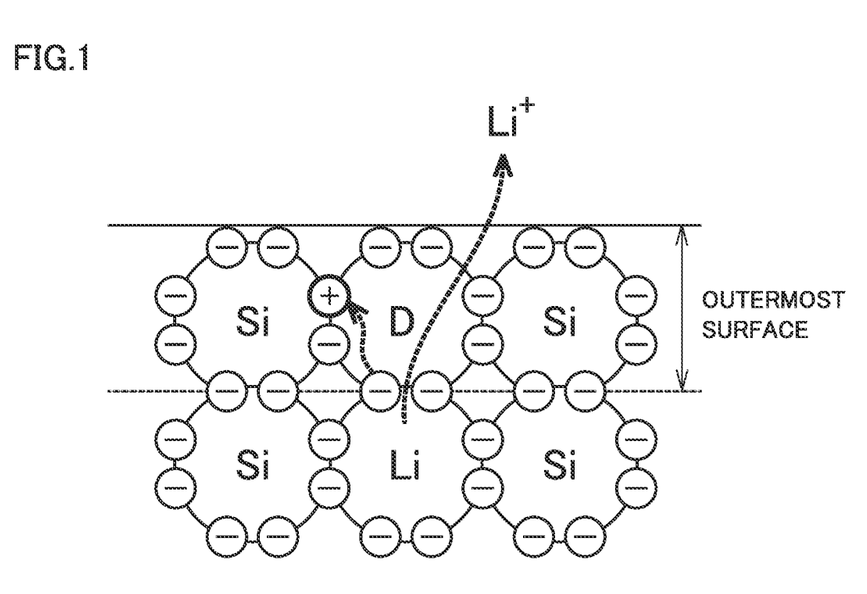
FIG. 1 is a first conceptual view showing a negative electrode active material particle of the present disclosure.

FIG. 1 is a first conceptual view showing the negative electrode active material particle of the present disclosure.

When the dopant (D) is a group 13 element, D (group 13 element) serves as an acceptor with respect to Si (group 14 element). That is, positive holes (holes) can be generated by the dopant. It is considered that the generation of the holes facilitates movement of electrons to a surface of the particle. This presumably promotes dealloying of Li and $SiO_x$ (release of $Li^+$) during discharging. That is, it is expected to reduce a discharging resistance.

Figure 2:
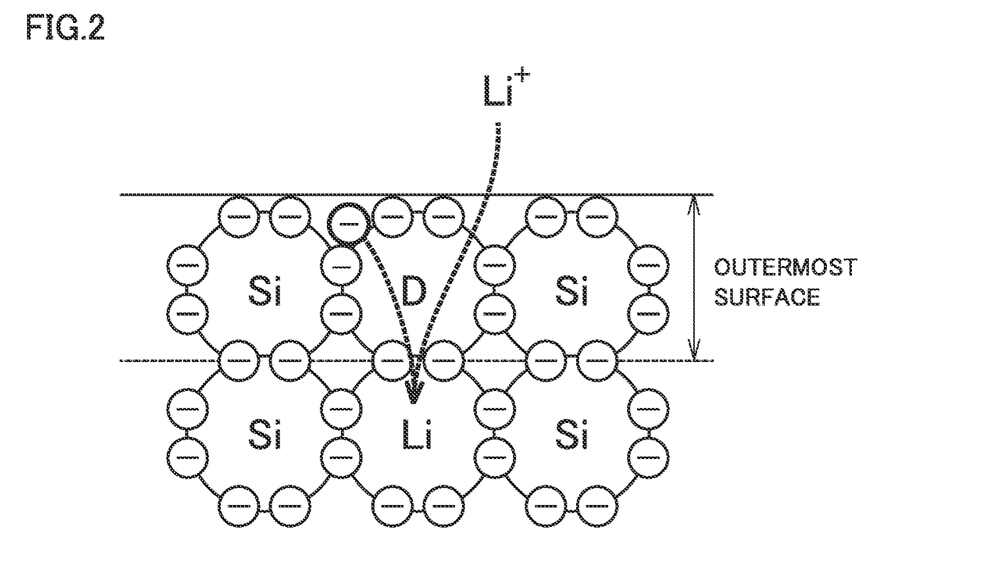
FIG. 2 is a second conceptual view showing a negative electrode active material particle of the present disclosure.

FIG. 2 is a second conceptual view showing the negative electrode active material particle of the present disclosure.

When the dopant (D) is a group 15 element, D (group 15 element) serves as a donor with respect to Si (group 14 element). That is, free electrons (carriers) can be generated by the dopant. It is considered that the generation of the carriers facilitates movement of electrons to the center of the particle. This presumably promotes alloying of Li and $SiO_x$ (acceptance of $Li^+$) during charging. That is, it is expected to reduce a charging resistance.

It should be noted that the dopant has a specific distribution. That is, in the outermost surface of the particle, y in the formula (I) satisfies $10^{-11} \leq y \leq 10^{-1}$. In the center of the particle, y in the formula (I) satisfies $y \leq 10^{-12}$.

In the formula (I), y represents a ratio of an atomic concentration of D (dopant) to an atomic concentration of Si. Through an analysis by Auger electron spectroscopy in a depth direction, y in each position can be measured. In at least ten particles, y in each position can be measured. An arithmetic mean of the values of y measured in at least ten particles can be employed as a measurement result. It should be noted that when the negative electrode active material particle includes two or more types of dopants, y represents a total of the respective dopants.

Figure 3:
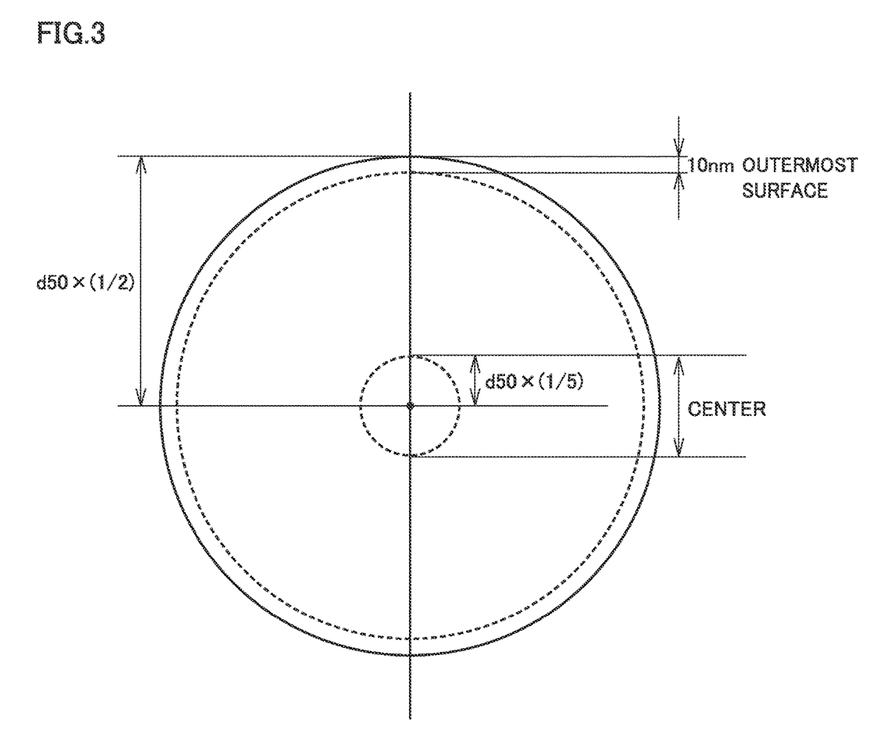
FIG. 3 is a conceptual view showing the outermost surface and center of the negative electrode active material particle of the present disclosure.

FIG. 3 is a conceptual view showing the outermost surface and center of the negative electrode active material particle of the present disclosure.

The term "outermost surface" in the present specification is intended to include the outermost surface of the particle and a range from the outermost surface to a position 10 nm away from the outermost surface in a direction (depth direction of the particle) from the outermost surface of the particle toward the center. The term "center" is intended to include a position distant away from the outermost surface by ½ of d50 and a range from the position to a position distant away from the foregoing position by ⅕ of d50 in the direction from the outermost surface of the particle toward the center. For the analysis in the depth direction, a particle having a size larger than ½ of d50 is used.

The term "d50" is also referred to as "median size". By a laser diffraction scattering method, "d50" can be measured. In a volume-based integrated particle size distribution, 50% of particles have a particle size smaller than d50, and 50% of the particles have a particle size larger than d50.

If the dopant is diffused to the entire particle, the electron conductivity may be decreased. It is presumed that an excess of holes or carriers inhibits alloying or dealloying of Li and $SiO_x$. If the dopant is diffused to the entire particle, it is considered that the relation of $y \leq 10^{-12}$ is not satisfied in the center of the particle.

When the relation of $10^{-11} \leq y \leq 10^{-1}$ is satisfied in the outermost surface of the particle, it is expected to improve the electron conductivity.

[2] D (dopant) may be B (boron) in the formula (I).

[3] D (dopant) may be at least one selected from a group consisting of P (phosphorus) and As (arsenic) in the formula (I).

[4] A negative electrode of the present disclosure at least includes the negative electrode active material particle recited in any one of [1] to [3]. According to the negative electrode of the present disclosure, in the lithium ion secondary battery, at least one of the discharging resistance and the charging resistance is expected to be reduced.

[5] A lithium ion secondary battery of the present disclosure at least includes the negative electrode recited in [4]. In the lithium ion secondary battery of the present disclosure, at least one of the discharging resistance and the charging resistance is expected to be low. That is, the lithium ion secondary battery of the present disclosure is expected to be excellent in at least one of an output characteristic and an input characteristic.

[6] A method of producing a negative electrode active material particle in the present disclosure is a method of producing a negative electrode active material particle for a lithium ion secondary battery. The production method includes (α) and (β) as follows.

(α) A base material particle is prepared.

(β) The negative electrode active material particle is produced by doping the base material particle with a dopant.

The base material particle has a composition represented by the following formula (II):

$$SiO_x \quad \text{(II)}.$$

In the formula (II), x satisfies $0 \leq x \leq 1.5$.

The dopant is a group 13 element or a group 15 element in a periodic table.

A ratio of an atomic concentration of the dopant to an atomic concentration of Si is more than or equal to $10^{-11}$ and less than or equal to $10^{-1}$ in an outermost surface of the negative electrode active material particle. Moreover, the ratio of the atomic concentration of the dopant to the atomic concentration of Si is less than or equal to $10^{-12}$ in a center of the negative electrode active material particle.

According to the production method, the negative electrode active material particle in [1] can be produced.

The foregoing and other objects, features, aspects and advantages of the present disclosure will become more apparent from the following detailed description of the present disclosure when taken in conjunction with the accompanying drawings.

DESCRIPTION OF THE PREFERRED EMBODIMENTS

Hereinafter, an embodiment (referred to as "the present embodiment" in the present specification) of the present disclosure will be described. However, the description below is not intended to limit the scope of claims.

<Negative Electrode Active Material Particles>

Each of negative electrode active material particles of the present embodiment is a negative electrode active material particle for a lithium ion secondary battery. The negative electrode active material particle is alloyed with Li to occlude Li ions and is dealloyed from Li to release Li ions.

The negative electrode active material particles may have a d50 of 0.1 to 50 μm, for example. The negative electrode active material particles may have a d50 of 0.1 to 10 μm, for example. The negative electrode active material particles may have a d50 of 1 to 10 μm, for example. The shape of each of the negative electrode active material particles should not be limited in particular. The negative electrode active material particle can be a spherical particle, a rod-like particle, a plate-like particle, or the like, for example.

The negative electrode active material particle may be crystalline. The negative electrode active material particle may be amorphous. The negative electrode active material particle may include both a crystalline portion and an amorphous portion. The negative electrode active material particle may be single crystal. The negative electrode active material particle may be polycrystal.

The negative electrode active material particle of the present embodiment has a composition represented by the following formula (I):

$$SiO_xD_y \quad \text{(I)}.$$

In the formula (I), x represents a ratio of an atomic concentration of O (oxygen) to an atomic concentration of Si. X satisfies $0 \leq x \leq 1.5$. For example, x may satisfy $1 \leq x \leq 1.5$. For example, x can be measured by Auger electron spectroscopy, glow discharge mass spectrometry, inductively coupled plasma spectroscopy, or the like. X can be measured at least three times. An arithmetic means of the values of x measured at least 3 times can be employed as a measurement result.

D represents a dopant in the formula (I). D is a group 13 element or a group 15 element in a periodic table. When D is a group 13 element, holes can be generated. It is expected that the generation of the holes leads to reduced discharging resistance. The group 13 element may be B, Al (aluminum), Ga (gallium), In (indium), or the like, for example. The negative electrode active material particle may solely include one group 13 element. The negative electrode active material particle may include two or more group 13 elements. That is, in the formula (I), D may be at least one selected from a group consisting of B, Al, Ga, and In. D may be B in the formula (I).

When D is a group 15 element, carriers can be generated. It is expected that the generation of the carriers leads to reduced charging resistance. The group 15 element may be P (phosphorus), As (arsenic), Sb (antimony), or the like, for example. The negative electrode active material particle may solely include one group 15 element. The negative electrode active material particle may include two or more group 15 elements. That is, in the formula (I), D may be at least one selected from a group consisting of P, As, and Sb. In the formula (I), D may be at least one selected from a group consisting of P and As.

In an outermost surface of the negative electrode active material particle, y in the formula (I) satisfies $10^{-11} \leq y \leq 10^{-1}$. Accordingly, it is expected to improve electron conductivity. In the outermost surface of the negative electrode active material particle, y in the formula (I) may be more than or equal to $10^{-6}$ or may be more than or equal to $10^{-5}$, for example. In the outermost surface of the negative electrode active material particle, y in the above-described formula (I) may be less than or equal to $10^{-3}$ or may be less than or equal to $10^{-4}$, for example.

In the center of the negative electrode active material particle, y in the formula (I) satisfies $y \leq 10^{-12}$. In consideration of precision of the Auger electron spectroscopy, it is considered that substantially no dopant exists in the center of the negative electrode active material particle when $y \leq 10^{-12}$ is satisfied in the center of the negative electrode active material particle. In the center of the negative electrode active material particle, when y is more than $10^{-12}$, the electron conductivity may be decreased. In the center of the negative electrode active material particle, y in the formula (I) may satisfy $10^{-14} \leq y \leq 10^{-12}$, for example.

<Method of Producing Negative Electrode Active Material Particles>

The negative electrode active material particles of the present embodiment may be produced by the following production method.

Figure 4:
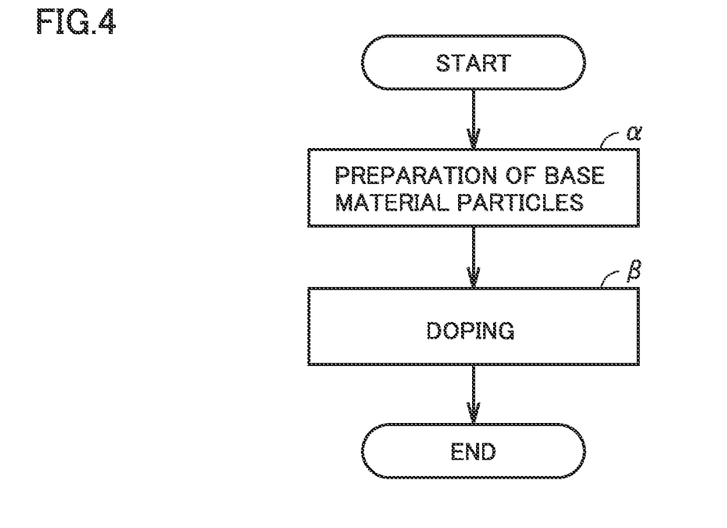
FIG. 4 is a flowchart schematically showing a method of producing the negative electrode active material particle in the present embodiment.

FIG. 4 is a flowchart schematically showing a method of producing the negative electrode active material particle in the present embodiment. The production method includes: "(α) preparation of base material particles"; and "(β) doping".

<<(α) Preparation of Base Material Particles>>

The method of producing the negative electrode active material particles in the present embodiment includes preparing base material particles.

Each of the base material particles has a composition represented by the following formula (II):

$$SiO_x \qquad (II).$$

In the formula (II), x satisfies $0 \leq x \leq 1.5$. That is, the base material particle may be a Si particle. The base material particle may be a $SiO_{1.5}$ particle. The base material particles may be purchased. The base material particles may be produced. For example, a Si single-crystal ingot or a Si polycrystal ingot may be produced by liquid phase growth method, vapor phase growth method, or the like. By pulverizing the Si single-crystal ingot, the Si polycrystal ingot, or the like, the base material particles may be prepared. For example, $SiO_{1.5}$ gas may be generated by heating a mixture of $SiO_2$ and Si. By cooling the $SiO_{1.5}$ gas, a $SiO_{1.5}$ deposit may be generated. By pulverizing the deposit, $SiO_{1.5}$ particles may be prepared.

The base material particles may have a d50 of 0.1 to 50 µm, for example. The base material particles may have a d50 of 0.1 to 10 µm, for example. The base material particles may have a d50 of 1 to 10 µm, for example. The shape of each of the base material particles should not be limited in particular. The base material particle may be a spherical particle, a rod-like particle, a plate-like particle, or the like, for example.

<<(β) Doping>>

The method of producing the negative electrode active material particles in the present embodiment includes producing the negative electrode active material particles by doping the base material particles with a dopant. As described above, the dopant is a group 13 element or a group 15 element in the periodic table.

The doping may be performed by a thermal diffusion method, an ion implantation method, or the like, for example. In the present specification, doping by the thermal diffusion method will be described as an example.

The base material particles (powder) are placed in a predetermined container. A material gas is prepared. For example, when doping with B, $BF_3$ gas, $BCl_3$ gas, $B_2H_6$ gas, or the like may be used as the material gas. For example, when doping with P, $PH_3$ gas, $PF_5$ gas, $POCl_3$ gas, or the like may be used as the material gas. For example, when doping with As, $AsH_3$ gas, $AsF_3$ gas, or the like may be used as the material gas. The material gas may be diluted appropriately with $N_2$ (nitrogen) gas, Ar (argon) gas, or the like, for example. A mixed gas of the material gas and $O_2$ gas is introduced into the container.

The base material particles are heated. A heating temperature may be 550 to 650° C., for example. A heating time may be more than or equal to 1 hour and less than or equal to 11 hours, for example. A doping amount may be adjusted according to the heating time on this occasion, for example.

After the heating in the mixed gas, $O_2$ gas substitutes for the gas inside the container. In the $O_2$ gas, the base material particles are heated further. A heating temperature may be 800 to 1200° C., for example. A heating time may be 10 minutes to 1 hour, for example. Accordingly, the dopant may be diffused near the outermost surface of each of the base material particles. In this way, the negative electrode active material particles can be produced.

In the present embodiment, in the outermost surface of the negative electrode active material particle, a ratio (i.e., y in the formula (I)) of an atomic concentration of the dopant to an atomic concentration of Si is more than or equal to $10^{-11}$ and less than or equal to $10^{-1}$. Moreover, in the center of the negative electrode active material particle, the ratio of the atomic concentration of the dopant to the atomic concentration of Si is less than or equal to $10^{-12}$. In order to satisfy these conditions, the doping conditions are adjusted appropriately. In the center of the negative electrode active material particle, the ratio of the atomic concentration of the dopant to the atomic concentration of Si may be more than or equal to $10^{-14}$, for example.

<Lithium Ion Secondary Battery>

The following describes a lithium ion secondary battery in the present embodiment.

Figure 5:
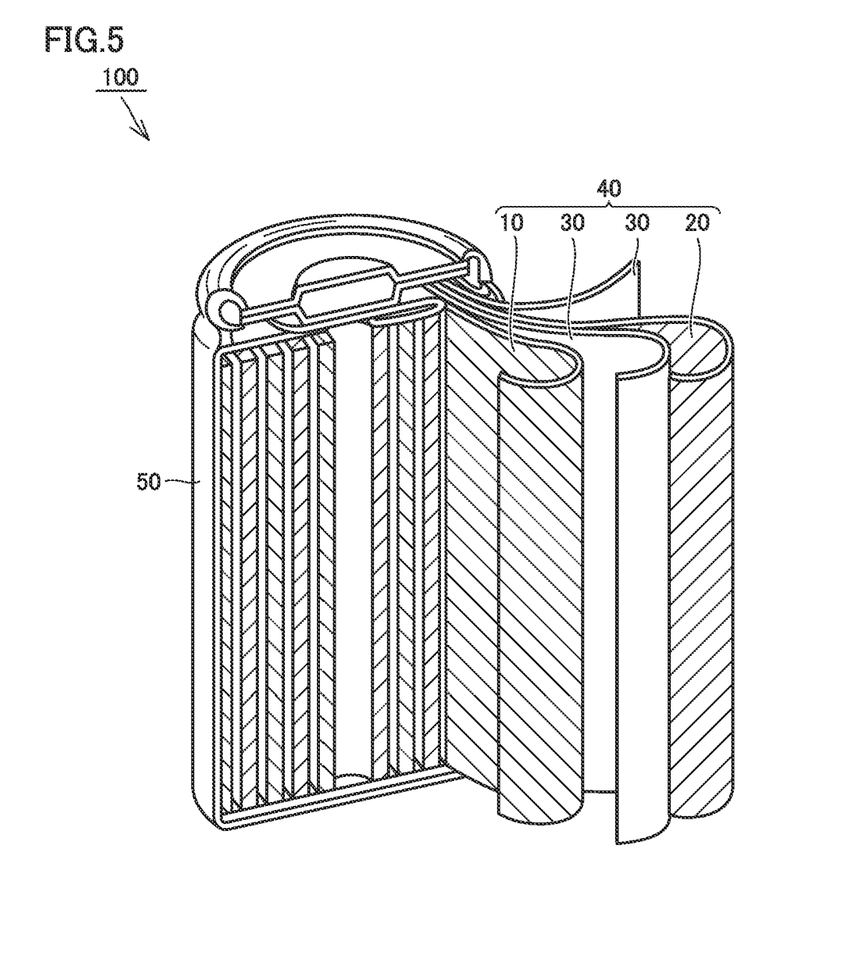
FIG. 5 is a schematic view showing an exemplary configuration of a lithium ion secondary battery in the present embodiment.

FIG. 5 is a schematic view showing an exemplary configuration of the lithium ion secondary battery in the present embodiment. In the description below, the lithium ion secondary battery may be simply described as "battery".

A battery 100 includes a case 50. Case 50 has a cylindrical shape. It should be noted that the case should not be limited to the cylindrical shape in the present embodiment. The case may have a prismatic shape (flat profile rectangular parallelepiped), for example.

Case 50 is sealed. Cases 50 may be composed of Fe (iron), stainless steel, an Al alloy, or the like, for example. However, as long as case 50 is sealed, the case (external covering) may be a pouch composed of an Al laminate film or the like, for example. Case 50 may include a current interrupt device (CID), a gas exhaust valve, and the like Case 50 has an electrode group 40 and an electrolyte (not shown) stored therein. Electrode group 40 includes a positive electrode 10, a negative electrode 20, and a separator 30. That is, the lithium ion secondary battery in the present embodiment at least includes negative electrode 20.

Electrode group 40 is of wound type. That is, electrode group 40 is constructed by: layering positive electrode 10, separator 30, negative electrode 20, and separator 30 in this order; and winding them in the form of a spiral. The electrode group of the present embodiment may be of a stack type. The stack type electrode group can be constructed by alternately stacking a positive electrode and a negative electrode with a separator being interposed between the positive electrode and the negative electrode.

<<Negative Electrode>>

Negative electrode 20 of the present embodiment is a sheet in the form of a strip. Negative electrode 20 may include a negative electrode collector and a negative electrode composite material layer. The negative electrode collector may be a Cu (copper) foil, a Cu alloy foil, or the like, for example. The negative electrode collector may have a thickness of 5 to 50 μm, for example. In the present specification, the thickness of each configuration can be measured using a micrometer or the like, for example. The thickness can be measured at least 3 times. An arithmetic means of values of the thickness measured at least 3 times can be employed as a measurement result.

The negative electrode composite material layer may be formed on a surface of the negative electrode collector. The negative electrode composite material layer may be formed on each of front and backside surfaces of the negative electrode collector. The negative electrode composite material layer may have a thickness of 10 to 200 μm, for example. The negative electrode composite material layer at least includes the negative electrode active material particles in the present embodiment. That is, negative electrode 20 at least includes the negative electrode active material particles in the present embodiment.

For example, the negative electrode composite material layer may include 70 to 98 mass % of the negative electrode active material particles, 1 to 15 mass % of a conductive material, and 1 to 15 mass % of a binder. The negative electrode composite material layer may solely include one type of Si-based negative electrode active material particle. The negative electrode composite material layer may include two or more types of Si-based negative electrode active material particles. For example, the negative electrode composite material layer may include both a Si-based negative electrode active material particle doped with a dopant of a group 13 element, and a Si-based negative electrode active material particle doped with a dopant of a group 15 element. Accordingly, it is expected to improve both an output characteristic and an input characteristic, for example.

In addition to the negative electrode active material particles (Si-based negative electrode active material particles) in the present embodiment, the negative electrode composite material layer may further include carbon-based negative electrode active material particles. By the combination of the Si-based negative electrode active material particles and the carbon-based negative electrode active material particles, it is expected to improve balance between the cycle characteristic and the capacity. For example, the Si-based negative electrode active material particles and the carbon-based negative electrode active material particles may satisfy the following relation: the Si-based negative electrode active material particles: the carbon-based negative electrode active material particles=5:95 to 95:5 (mass ratio).

The carbon-based negative electrode active material particle includes a graphite structure. The graphite structure represents a crystal structure in which carbon hexagonal net planes are layered. The carbon-based negative electrode active material particle may be graphite, soft carbon, hard carbon, or the like, for example. The graphite may be artificial graphite. The graphite may be natural graphite. One type of carbon-based negative electrode active material particle may be used solely. Two or more types of carbon-based negative electrode active material particles may be used in combination.

The conductive material assists electron conduction in the negative electrode composite material layer. The conductive material should not be limited in particular. Examples of the conductive material may include carbon black, vapor growth carbon fiber (VGCF), carbon nanotube (CNT), graphene flake, activated carbon, and the like. Examples of the carbon black may include acetylene black (AB), Ketchen Black®, and the like. One type of conductive material may be used solely. Two or more types of conductive materials may be used in combination.

The binder binds components to each other in the negative electrode composite material layer. The binder binds the negative electrode composite material layer to the negative electrode collector. The binder should not be limited in particular. Examples of the binder may include polyamide (PA), polyimide (PI), polyamide-imide (PAI), polyvinylidene difluoride (PVdF), polytetrafluoroethylene (PTFE), vinylidene fluoride-hexafluoropropylene copolymer [poly (VDF-co-HFP)], styrene-butadiene rubber (SBR), carboxymethylcellulose (CMC), polyacrylate (PAA), and the like. One type of binder may be used solely. Two or more types of binders may be used in combination.

<<Positive Electrode>>

Positive electrode 10 of the present embodiment is a sheet in the form of a strip. Positive electrode 10 may include a positive electrode collector and a positive electrode composite layer, for example. The positive electrode collectors may be an Al foil, an Al alloy foil, or the like, for example. The positive electrode collector may have a thickness of 5 to 50 μm, for example.

The positive electrode composite layer may be formed on a surface of the positive electrode collector. The positive electrode composite layer may be formed on front and backside surfaces of the positive electrode collector. The positive electrode composite layer may have a thickness of 10 to 200 μm, for example. The positive electrode composite layer may include positive electrode active material particles, a conductive material, and a binder. For example, the positive electrode composite layer may include 80 to 98 mass % of the positive electrode active material particles, 1 to 10 mass % of the conductive material, and 1 to 10 mass % of the binder.

The positive electrode active material particles may have a d50 of 1 to 30 μm, for example. Each of the positive electrode active material particles electrochemically occludes Li ions and releases them. The positive electrode active material particles should not be limited in particular. Examples of the positive electrode active material particles may include $LiCoO_2$, $LiNiO_2$, $LiMnO_2$, $LiMn_2O_4$, $LiNi_aCO_bM_cO_2$ (where M is Mn or Al and a, b, and c satisfy $0<a<1$, $0<b<1$, $0<c<1$, and $a+b+c=1$), $LiFePO_4$, and the like. One type of positive electrode active material particle may be used solely. Two or more types of positive electrode active material particles may be used in combination.

The conductive material should not be limited in particular. The conductive material may be one illustrated as the conductive material of the negative electrode composite material layer, for example. One type of conductive material may be used solely. Two or more types of conductive materials may be used in combination. The binder should not be also limited in particular. Examples of the binder may include PVdF, PTFE, poly(VDF-co-HFP), CMC, PAA, and the like. One type of binder may be used solely. Two or more types of binders may be used in combination.

<<Separator>>

Separator 30 is a sheet in the form of a strip. Separator 30 is disposed between positive electrode 10 and negative electrode 20. Separator 30 may have a thickness of 10 to 50 µm, for example. Separator 30 is porous. Separator 30 is composed of an electrically insulative material. Separator 30 may be composed of polyethylene (PE), polypropylene (PP), or the like, for example.

Separator 30 may have a single-layer structure, for example. Separator 30 may be constructed only of a porous film composed of PE, for example. Separator 30 may have a multilayer structure (for example, three-layer structure), for example. Separator 30 may be constructed by layering a porous film composed of PP, a porous film composed of PE and a porous film composed of PP in this order, for example. Separator 30 may include a heat-resistant layer on a surface thereof. The heat-resistant layer is porous. The heat-resistant layer includes a heat-resistant material. The heat-resistant material may be alumina or the like, for example.

<<Electrolyte>>

The electrolyte of the present embodiment is typically an electrolyte solution (liquid electrolyte). However, in the present embodiment, the electrolyte may be a gel electrolyte. The electrolyte may be a solid electrolyte.

The electrolyte solution includes a solvent and a Li salt. The electrolyte solution may also include 0.5 to 2.0 mol/l of the Li salt, for example. The Li salt functions as a supporting electrolyte. Examples of the Li salt may include $LiPF_6$, $LiBF_4$, $Li[N(FSO_2)_2]$, $Li[N(CF_3SO_2)_2]$, and the like. One type of Li salt may be used solely. Two or more types of Li salts may be used in combination.

The solvent is aprotic. The solvent may be a mixture of a cyclic carbonate and a chain carbonate, for example. A mixing ratio thereof may be, for example, as follows: the cyclic carbonate:the chain carbonate=1:9 to 5:5 (volume ratio).

Examples of the cyclic carbonate may include ethylene carbonate (EC), propylene carbonate (PC), butylene carbonate (BC), fluoroethylene carbonate (FEC), and the like. One type of cyclic carbonate may be used solely. Two or more types of cyclic carbonates may be used in combination.

Examples of the chain carbonate may include dimethyl carbonate (DMC), ethyl methyl carbonate (EMC), diethyl carbonate (DEC), and the like. One type of chain carbonate may be used solely. Two or more types of chain carbonates may be used in combination.

The solvent may include lactone, cyclic ether, chain ether, carboxylate ester, or the like, for example. Examples of the lactone may include γ-butyrolactone (GBL), δ-valerolactone, and the like. Examples of the cyclic ether may include tetrahydrofuran (THF), 1,3-dioxolane, 1,4-dioxane, and the like. Examples of the chain ether may include 1,2-dimethoxyethane (DME) and the like. Examples of the carboxylate ester may include methyl formate (MF), methyl acetate (MA), methyl propionate (MP), and the like.

In addition to the solvent and the Li salt, the electrolyte solution may further include various types of functional additives. The electrolyte solution may include 1 to 5 mass % of a functional additive, for example. Examples of the functional additive include a gas generation agent (overcharge additive), a film formation agent, and the like. Examples of the gas generation agent include cyclohexylbenzene (CHB), biphenyl (BP), and the like. Examples of the film formation agent may include vinylene carbonate (VC), vinyl ethylene carbonate (VEC), $Li[B(C_2O_4)_2]$, $LiPO_2F_2$, propane sultone (PS), ethylene sulfite (ES), and the like.

<<Applications of Lithium Ion Secondary Battery>>

The lithium ion secondary battery of the present embodiment is expected to have a high capacity. The lithium ion secondary battery of the present embodiment is expected to be excellent in at least one of the input characteristic and the output characteristic. This is because the lithium ion secondary battery of the present embodiment includes the negative electrode active material particles (Si-based negative electrode active material particles) of the present embodiment.

Examples of applications in which the high capacity, the input characteristic, and the output characteristic are utilized include power supplies for driving a hybrid vehicle (HV), a plug-in hybrid vehicle (PHV), an electric vehicle (EV), and the like. However, the applications of the lithium ion secondary battery of the present embodiment should not be limited to the power supplies for driving the vehicles. The lithium ion secondary battery of the present embodiment is applicable to any application.

EXAMPLES

Hereinafter, examples of the present disclosure will be described. It should be noted that the description below is not intended to limit the scope of claims.

Experiment 1

In an experiment 1, Si particles were used as base material particles.

Example 1-1

1. Production of Negative Electrode Active Material Particles (α) Preparation of Base Material Particles As the base material particles, Si particles [$SiO_x$ (x=0)] were prepared. The Si particles have a d50 of 5 µm.

(β) Doping

The base material particles were placed in a predetermined container. $BF_3$ gas was prepared as a material gas. A mixed gas of $BF_3$ gas and $O_2$ gas was introduced into the container. The base material particles were heated. A heating temperature was 600° C. A heating time was 1 hour.

After the heating in the mixed gas, $O_2$ gas substituted for the gas inside the container. In the $O_2$ gas, the base material particles were heated further. A heating temperature was 1000° C. Accordingly, negative electrode active material particles were produced. In Example 1-1, the dopant is B (group 13 element).

2. Production of Negative Electrode

The following materials were prepared.

Negative electrode active material particles: those produced as described above

Conductive material: AB

Binder: PI

Negative electrode collector: Cu foil

A negative electrode paste was prepared by mixing the negative electrode active material particles, the conductive material, the binder, and a predetermined solvent. The negative electrode paste was applied onto a surface of the negative electrode collector and was dried, thereby forming a negative electrode composite material layer. Accordingly, a negative electrode was produced. The negative electrode was cut into the form of a strip.

The negative electrode composite material layer includes 80 mass % of the negative electrode active material particles, 10 mass % of the conductive material, and 10 mass % of the binder. That is, the negative electrode at least includes the negative electrode active material particles.

3. Production of Lithium Ion Secondary Battery

A positive electrode in the form of a strip and a separator in the form of a strip were prepared. As positive electrode active material particles, the positive electrode includes $LiNi_{1/3}Co_{1/3}Mn_{1/3}O_2$. The positive electrode, the separator, the negative electrode, and the separator were layered in this order and were wound in the form of a spiral. Accordingly, an electrode group was formed.

A case having a cylindrical shape was prepared. The electrode group was stored in the case. An electrolyte solution was injected into the case. The electrolyte solution includes the following components.

Solvent: [EC:DMC:EMC=3:4:3 (volume ratio)]

Li salt: $LiPF_6$ (1 mol/l)

The case was sealed. In this way, a battery (cylindrical lithium ion secondary battery) was produced. This battery is designed to have a predetermined rated capacity in a voltage range of 3 to 4.1 V. As described above, the battery at least includes the negative electrode.

Comparative Example 1-1

A battery was produced by the same production method as that in Example 1-1 except that the base material particles were used as the negative electrode active material particles without any modification.

Example 1-2, Example 1-3, and Comparative Example 1-2

Negative electrode active material particles and a battery were produced by the same production method as that in Example 1-1 except that a treatment time during the doping was changed as shown in Table 1 below. The "treatment time" in Table 1 below represents a heating time in the mixed gas of the material gas and the $O_2$ gas.

Example 1-4 to Example 1-6 and Comparative Example 1-3

Negative electrode active material particles and a battery were produced by the same production method as that in Example 1-1 except that a dopant and a treatment time were changed as shown in Table 1 below. In each of Example 1-4 to Example 1-6 and Comparative Example 1-3, the dopant is P (group 15 element). $PH_3$ gas was used for the material gas.

Example 1-7 to Example 1-9 and Comparative Example 1-4

Negative electrode active material particles and a battery were produced by the same production method as that in Example 1-1 except that a dopant and a treatment time were changed as shown in Table 1 below. In each of Example 1-7 to Example 1-9 and Comparative Example 1-4, the dopant is As (group 15 element). $AsH_3$ gas was used for the material gas.

<Evaluation>

<<Negative Electrode Active Material Particles>>

Through an analysis by the Auger electron spectroscopy in the depth direction, a ratio (i.e., y in the above-described formula (I)) of the atomic concentration of the dopant to the atomic concentration of Si was measured in the outermost surface of each of the negative electrode active material particles. Through the analysis by the Auger electron spectroscopy in the depth direction, the ratio of the atomic concentration of the dopant to the atomic concentration of Si was measured in the center of each of the negative electrode active material particles. Results thereof are shown in Table 1 below.

<<Initial Capacity and Initial Efficiency>>

An initial capacity of the battery was measured. A value shown in the column "Initial Capacity" in Table 1 below is a value obtained by dividing the initial capacity of each sample by the initial capacity of Comparative Example 1-1.

By dividing the initial discharging capacity by the initial charging capacity, initial efficiency was calculated. Results are shown in Table 1 below. It is considered that as the initial efficiency is higher, the cycle characteristic is more excellent.

<<Discharging Resistance>>

In the description below, "C" is used as the unit of current. A current of "1C" serves to discharge the rated capacity of the battery in 1 hour.

A discharging resistance was measured in each of Comparative Example 1-1, Comparative Example 1-2, and Example 1-1 to Example 1-3. The battery was placed in a thermostatic chamber set at 25° C. The SOC (state of charge) of the battery was adjusted to 50%. The battery was discharged for 10 seconds by a current of 5C. The discharging resistance was calculated based on an amount of decrease of voltage during the discharging. A value shown in the column "Discharging Resistance" in Table 1 below is a value obtained by dividing the discharging resistance of each sample by the discharging resistance of Comparative Example 1-1. It is considered that as the value is smaller, the electron conductivity of the negative electrode active material particle is more improved during the discharging.

<<Charging Resistance>>

A charging resistance was measured in each of Comparative Example 1-1, Comparative Example 1-3, Comparative Example 1-4, and Example 1-4 to Example 1-9. The battery was placed in a thermostatic chamber set at 25° C. The SOC of the battery was adjusted to 50%. The battery was charged for 10 seconds by a current of 5C. The charging resistance was calculated based on an amount of increase of voltage during the charging. A value shown in the column "Charging Resistance" in Table 1 below is a value obtained by dividing the charging resistance of each sample by the charging resistance of Comparative Example 1-1. It is considered that as the value is smaller, the electron conductivity of the negative electrode active material particle is more improved during the charging.

TABLE 1

<Experiment 1> Sample List

| | Base Material Particle SiO$_x$ (0 ≤ x ≤ 1.5) x | Doping Dopant (D) | Doping Treatment Time [h] | Negative Electrode Active Material Particle SiO$_x$D$_y$ y (=D/Si) Outermost Surface | Negative Electrode Active Material Particle SiO$_x$D$_y$ y (=D/Si) Center | Evaluation Initial Capacity [—] | Evaluation Initial Efficiency [%] | Evaluation Discharging Resistance [—] | Evaluation Charging Resistance [—] |
|---|---|---|---|---|---|---|---|---|---|
| Comparative Example 1-1 | 0 | | | $10^{-14}$ | $10^{-13}$ | 1 | 90 | 1 | 1 |
| Comparative Example 1-2 | 0 | B | 24 | $10^{-6}$ | $10^{-7}$ | 0.71 | 76 | 1.37 | |
| Example 1-1 | 0 | B | 1 | $10^{-11}$ | $10^{-12}$ | 0.99 | 91 | 0.95 | |
| Example 1-2 | 0 | B | 4 | $10^{-3}$ | $10^{-13}$ | 1.02 | 88 | 0.84 | |
| Example 1-3 | 0 | B | 8 | $10^{-1}$ | $10^{-12}$ | 1.01 | 89 | 0.94 | |
| Comparative Example 1-3 | 0 | P | 27 | $10^{-8}$ | $10^{-7}$ | 0.69 | 74 | | 1.45 |
| Example 1-4 | 0 | P | 2 | $10^{-11}$ | $10^{-12}$ | 1 | 90 | | 0.97 |
| Example 1-5 | 0 | P | 5 | $10^{-5}$ | $10^{-12}$ | 1.03 | 89 | | 0.85 |
| Example 1-6 | 0 | P | 9 | $10^{-1}$ | $10^{-12}$ | 1.02 | 88 | | 0.95 |
| Comparative Example 1-4 | 0 | As | 29 | $10^{-7}$ | $10^{-7}$ | 0.7 | 75 | | 1.41 |
| Example 1-7 | 0 | As | 4 | $10^{-11}$ | $10^{-12}$ | 0.98 | 92 | | 0.96 |
| Example 1-8 | 0 | As | 6 | $10^{-4}$ | $10^{-14}$ | 1.01 | 87 | | 0.85 |
| Example 1-9 | 0 | As | 11 | $10^{-1}$ | $10^{-12}$ | 1.03 | 90 | | 0.96 |

<Result of Experiment 1>

As shown in Table 1 above, the discharging resistance in each of Example 1-1 to Example 1-3 is lower than that of Comparative Example 1-1. That is, it is considered that the electron conductivity during the discharging is improved. This is presumably because holes are generated by the doping of the group 13 element (B). That is, it is considered that due to the generation of the holes, the electron conduction of the negative electrode active material particle is active during the discharging.

In each of Example 1-1 to Example 1-3, y satisfies $10^{-11} \leq y \leq 10^{-1}$ in the outermost surface of the negative electrode active material particle. When y is more than $10^{-12}$ in the center of the negative electrode active material particle, the discharging resistance is increased (Comparative Example 1-2).

As shown in Table 1 above, the charging resistance in each of Example 1-4 to Example 1-9 is lower than that in Comparative Example 1-1. That is, it is considered that the electron conductivity during the charging is improved. This is presumably because carriers are generated by the doping of the group 15 element (P, As). That is, it is considered that due to the generation of the carriers, the electron conduction of the negative electrode active material particle is active during the charging.

In each of Example 1-4 to Example 1-9, y satisfies $10^{-11} \leq y \leq 10^{-1}$ in the outermost surface of the negative electrode active material particle. When y is more than $10^{-12}$ in the center of the negative electrode active material particle, the discharging resistance is increased (Comparative Example 1-3 and Comparative Example 1-4).

It is recognized that the initial capacity of each of Example 1-1 to Example 1-9 is substantially the same as the initial capacity of Comparative Example 1-1. It is recognized that the initial efficiency of each of Example 1-1 to Example 1-9 is substantially the same as the initial efficiency of Comparative Example 1-1.

Experiment 2

In an experiment 2, SiO particles [SiO$_x$ (x=1.5)] were used as the base material particles instead of the Si particles. The SiO particles have a d50 of 5 μm. Samples were produced by the same production method as that of experiment 1 except that doping conditions shown in Table 2 below were employed. Each sample was evaluated by the same method as that in experiment 1. Results are shown in Table 2 below.

A value shown in the column "Initial Capacity" in Table 2 below is a value obtained by dividing the initial capacity of each sample by the initial capacity of Comparative Example 2-1. The value shown in the column "Discharging Resistance" is a value obtained by dividing the discharging resistance of each sample by the discharging resistance of Comparative Example 2-1. A value shown in the column "Charging Resistance" below is a value obtained by dividing the charging resistance of each sample by the charging resistance of Comparative Example 2-1.

TABLE 2

<Experiment 2> Sample List

| | Base Material Particle SiO$_x$ ($0 \leq x \leq 1.5$) x | Doping Dopant (D) | Doping Treatment Time [h] | Negative Electrode Active Material Particle SiO$_x$D$_y$ y (=D/Si) Outermost Surface | Negative Electrode Active Material Particle SiO$_x$D$_y$ y (=D/Si) Center | Evaluation Initial Capacity [—] | Evaluation Initial Efficiency [%] | Evaluation Discharging Resistance [—] | Evaluation Charging Resistance [—] |
|---|---|---|---|---|---|---|---|---|---|
| Comparative Example 2-1 | 1.5 | | | $10^{-13}$ | $10^{-13}$ | 1 | 75 | 1 | 1 |
| Comparative Example 2-2 | 1.5 | B | 21 | $10^{-6}$ | $10^{-7}$ | 0.7 | 64 | 1.27 | |
| Example 2-1 | 1.5 | B | 1 | $10^{-11}$ | $10^{-12}$ | 0.97 | 76 | 0.97 | |
| Example 2-2 | 1.5 | B | 3 | $10^{-3}$ | $10^{-13}$ | 1.01 | 75 | 0.89 | |
| Example 2-3 | 1.5 | B | 7 | $10^{-1}$ | $10^{-12}$ | 1 | 77 | 0.91 | |
| Comparative Example 2-3 | 1.5 | P | 23 | $10^{-7}$ | $10^{-7}$ | 0.69 | 69 | | 1.36 |
| Example 2-4 | 1.5 | P | 1 | $10^{-11}$ | $10^{-12}$ | 1 | 75 | | 0.94 |
| Example 2-5 | 1.5 | P | 4 | $10^{-6}$ | $10^{-13}$ | 1.03 | 77 | | 0.87 |
| Example 2-6 | 1.5 | P | 8 | $10^{-1}$ | $10^{-12}$ | 1.02 | 77 | | 0.93 |
| Comparative Example 2-4 | 1.5 | As | 24 | $10^{-7}$ | $10^{-7}$ | 0.7 | 67 | | 1.38 |
| Example 2-7 | 1.5 | As | 2 | $10^{-11}$ | $10^{-12}$ | 0.98 | 75 | | 0.97 |
| Example 2-8 | 1.5 | As | 5 | $10^{-4}$ | $10^{-14}$ | 1.01 | 76 | | 0.88 |
| Example 2-9 | 1.5 | As | 9 | $10^{-1}$ | $10^{-12}$ | 1.03 | 75 | | 0.94 |

<Result of Experiment 2>

As shown in Table 2 above, the discharging resistance or the charging resistance in each of Example 2-1 to Example 2-9 is lower than that of Comparative Example 1-1. That is, also when each of the base material particles is the SiO particle [SiO$_x$ (x=1.5)], the electron conductivity of the negative electrode active material particle is improved by the doping of the group 13 element (B) or the group 15 element (P, As).

In each of Example 2-1 to Example 2-9, y satisfies $10^{-11} \leq y \leq 10^{-1}$ in the outermost surface of the negative electrode active material particle. When y is more than $10^{-12}$ in the center of the negative electrode active material particle, the discharging resistance or the charging resistance is increased (Comparative Example 2-2, Comparative Example 2-3, and Comparative Example 2-4).

It is recognized that the initial capacity of each of Example 2-1 to Example 2-9 is substantially the same as the initial capacity of Comparative Example 2-1. It is recognized that the initial efficiency of each of Example 2-1 to Example 2-9 is substantially the same as the initial efficiency of Comparative Example 2-1.

The embodiments disclosed herein are illustrative and non-restrictive in any respect. The technical scope defined by the claims is intended to include any modifications within the scope and meaning equivalent to the terms of the claims.

What is claimed is:

1. A negative electrode active material particle for a lithium ion secondary battery, the negative electrode active material particle consisting of a composition represented by the following formula (I):

SiO$_x$D$_y$                    (I), where x satisfies $0 \leq x \leq 1.5$, D is at least one element selected from the group consisting of B, Al, Ga and In, in an outermost surface of the negative electrode active material particle, y satisfies $10^{-11} \leq y \leq 10^{-1}$, and in a center of the negative electrode active material particle, y satisfies $y \leq 10^{-12}$.

2. The negative electrode active material particle according to claim 1, wherein D is B.

3. A negative electrode active material particle for a lithium ion secondary battery, the negative electrode active material particle consisting of a composition represented by the following formula (I):

SiO$_x$D$_y$                    (I), where x satisfies $0 \leq x \leq 1.5$, D is at least one element selected from the group consisting of P, As and Sb, in an outermost surface of the negative electrode active material particle, y satisfies $10^{-11} \leq y \leq 10^{-1}$, and in a center of the negative electrode active material particle, y satisfies $y \leq 10^{-12}$.

4. A negative electrode at least comprising the negative electrode active material particle recited in claim 1.

5. A lithium ion secondary battery at least comprising the negative electrode recited in claim 4.

6. A method of producing a negative electrode active material particle for a lithium ion secondary battery, the method comprising:

preparing a base material particle having a composition represented by the following formula (II): SiO$_x$ . . . (II), where x satisfies $0 \leq x \leq 1.5$; and either (i) doping the base material particle with an effective amount of at least one group 13 dopant element selected from the group consisting of B, Al, Ga and In to form a negative electrode active material particle having a ratio of an atomic concentration of the at least one group 13 dopant element to an atomic concentration of Si of more than or equal to $10^{-11}$ and less than or equal to $10^{-1}$ in an outermost surface of the negative electrode active material particle, where the doping of the base material particle is conducted such that the ratio of the atomic concentration of the at least one group 13 dopant element to the atomic concentration of Si is less than or equal to $10^{-12}$ in a center of the negative electrode active material particle; or (ii) doping the base material particle with an effective amount of at least one group 15 dopant element selected from the group consisting of P, As and Sb to form a negative electrode active material particle having a ratio of an atomic concentration of the at least one group 15 dopant element to an atomic concentration of Si of more than or equal to $10^{-11}$ and less than or equal to $10^{-1}$ in an outermost surface of the negative electrode active material particle, where the doping of the base material particle is conducted such that the ratio of the atomic concentration of the at least one group 15 dopant element to the atomic concentration of Si is less than or equal to $10^{-12}$ in a center of the negative electrode active material particle.

7. The negative electrode active material particle according to claim 3, wherein in the formula (I), D is at least one element selected from the group consisting of P and As.

8. A negative electrode at least comprising the negative electrode active material particle recited in claim 3.

9. A lithium ion secondary battery at least comprising the negative electrode recited in claim 8.

* * * * *